United States Patent
Yanagisawa et al.

(10) Patent No.: US 9,804,405 B2
(45) Date of Patent: Oct. 31, 2017

(54) DISPLAY DEVICE AND DISPLAY DEVICE FRAME

(71) Applicant: Semiconductor Energy Laboratory Co., Ltd., Atsugi-shi, Kanagawa-ken (JP)

(72) Inventors: Yuichi Yanagisawa, Atsugi (JP); Hisao Ikeda, Zama (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 4 days.

(21) Appl. No.: 14/546,434

(22) Filed: Nov. 18, 2014

(65) Prior Publication Data

US 2015/0146352 A1    May 28, 2015

(30) Foreign Application Priority Data

Nov. 27, 2013  (JP) ................................. 2013-244744

(51) Int. Cl.
*G02B 27/22* (2006.01)
*A47G 1/08* (2006.01)
(Continued)

(52) U.S. Cl.
CPC .......... *G02B 27/2221* (2013.01); *A47G 1/08* (2013.01); *G02B 5/005* (2013.01); *G06F 1/1601* (2013.01);
(Continued)

(58) Field of Classification Search
CPC .... G06F 1/1626; G06F 1/1601; G06F 1/1607; G06F 1/1637; G06F 2200/1612;
(Continued)

(56) References Cited

U.S. PATENT DOCUMENTS 5,546,689 A * 8/1996 Bomze ............... A47G 1/08
                                                        40/739
5,579,596 A * 12/1996 Kovacs ............... A47G 1/08
                                                        40/739

(Continued)

FOREIGN PATENT DOCUMENTS

JP    09-187573 A    7/1997
JP    2011-228759 A    11/2011

(Continued)

OTHER PUBLICATIONS

Three Dimensional Effect Filter-Stress of Three Dimensional Effect-, The Journal of the Institute of Image Information and Television Engineers, Nov. 17, 2000, vol. 24, No. 72, pp. 7-12, The Institute of Image Information and Television Engineers.

*Primary Examiner* — Hoa C Nguyen
*Assistant Examiner* — Keith Depew
(74) *Attorney, Agent, or Firm* — Robinson Intellectual Property Law Office; Eric J. Robinson

(57) ABSTRACT

To provide a display device that gives a viewer a strong stereoscopic effect or sense of depth in a two-dimensional image and a display device that gives a viewer a natural stereoscopic effect or sense of depth in a two-dimensional image, a display device including a frame portion and a display portion which has a display surface on a frame portion side and is located so as to be apart from the frame portion with a distance therebetween, in which the display portion overlaps with an opening of the frame portion, and an end portion of the display portion overlaps with the frame portion, is provided. In addition, a structure in which a corner of an inner frame of the frame portion has curvature or a structure in which the size of the inner frame of the frame portion is variable is added to the display device.

23 Claims, 11 Drawing Sheets

(51) Int. Cl.
*G06F 1/16* (2006.01)
*G02B 5/00* (2006.01)
*H04N 5/64* (2006.01)

(52) U.S. Cl.
CPC .......... *G06F 1/1607* (2013.01); *G06F 1/1626* (2013.01); *G06F 1/1637* (2013.01); *H04N 5/64* (2013.01); *G06F 2200/1612* (2013.01)

(58) Field of Classification Search
CPC ...... H04N 5/64; H04N 13/00; G02B 27/2221; G02B 5/005; G09F 15/0012; G09F 1/12
USPC .................................. 40/739, 743, 741, 740
See application file for complete search history.

(56) References Cited

U.S. PATENT DOCUMENTS

| | | | | |
|---|---|---|---|---|
| 5,621,994 | A * | 4/1997 | Cobb | G09F 15/0012 40/605 |
| 6,144,417 | A | 11/2000 | Yanagisawa | |
| 8,925,227 | B2 * | 1/2015 | Kuo | G09F 1/12 248/489 |
| 2001/0037593 | A1 * | 11/2001 | Korpai | G06F 1/1607 40/594 |
| 2006/0196094 | A1 * | 9/2006 | Sturmthal | G06F 1/1607 40/700 |
| 2007/0293120 | A1 * | 12/2007 | Bourgeault | A47G 1/0616 446/220 |
| 2010/0302174 | A1 * | 12/2010 | Cornell | G06F 3/0202 345/173 |
| 2011/0254037 | A1 | 10/2011 | Arasawa | |
| 2013/0155655 | A1 * | 6/2013 | Lee | H05K 5/03 362/97.1 |
| 2014/0035869 | A1 * | 2/2014 | Yun | G06F 3/0414 345/174 |
| 2014/0354791 | A1 * | 12/2014 | Lee | G06K 9/00228 348/77 |
| 2015/0037024 | A1 * | 2/2015 | Zhou | G03B 9/06 396/510 |
| 2015/0109544 | A1 * | 4/2015 | Yeo | G02F 1/133305 349/12 |
| 2015/0145755 | A1 * | 5/2015 | Yamazaki | G09G 3/32 345/76 |
| 2015/0145971 | A1 * | 5/2015 | Yanagisawa | H04N 13/04 348/54 |
| 2015/0282359 | A1 * | 10/2015 | Raccah | H05K 5/03 40/741 |
| 2015/0301347 | A1 * | 10/2015 | Juni | H04N 13/04 353/10 |

FOREIGN PATENT DOCUMENTS

| | | |
|---|---|---|
| JP | 2011-238908 A | 11/2011 |
| JP | 2013-146314 A | 8/2013 |
| WO | WO-2004/003630 | 1/2004 |
| WO | WO-2013/108665 | 7/2013 |

* cited by examiner

FIG. 1A
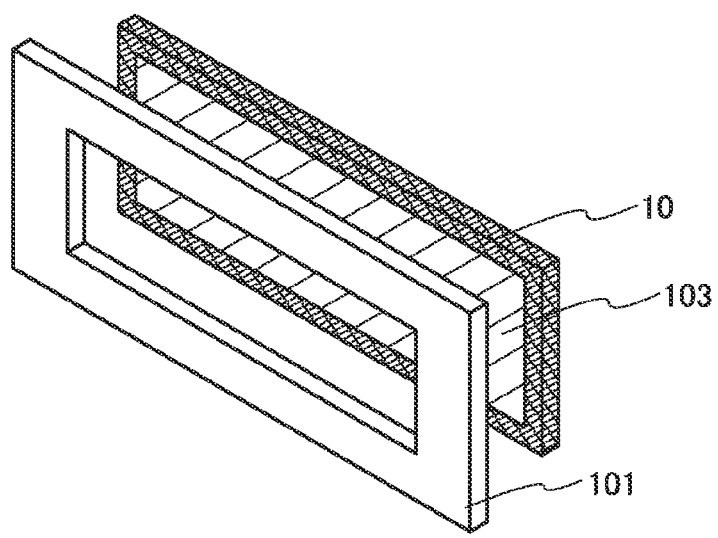
FIG. 1B
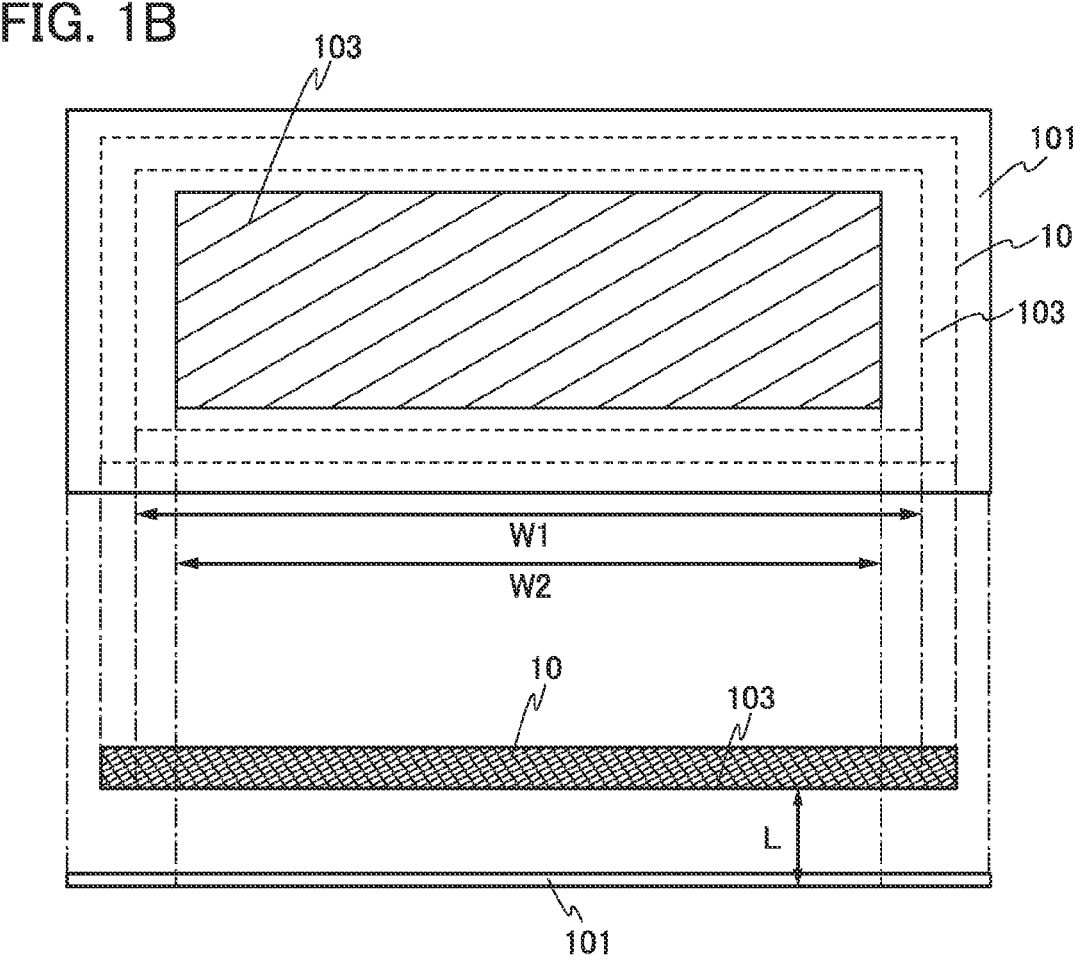

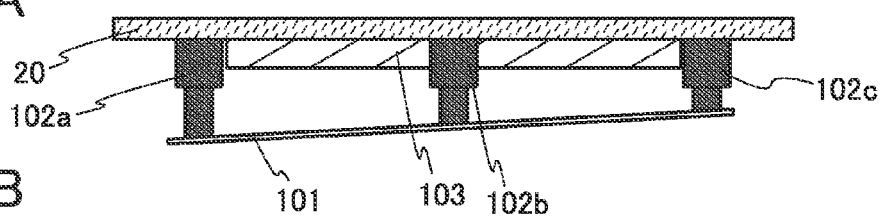
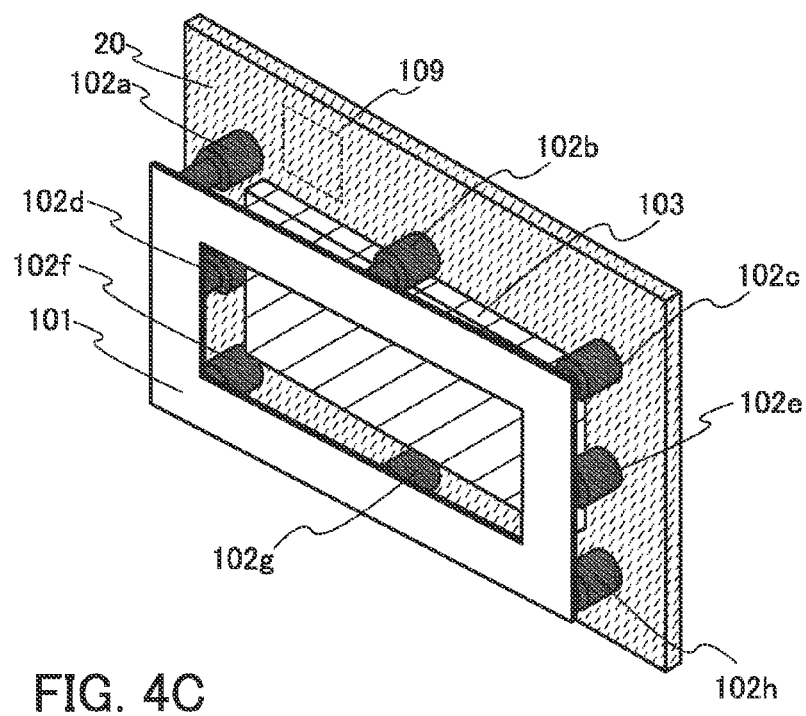
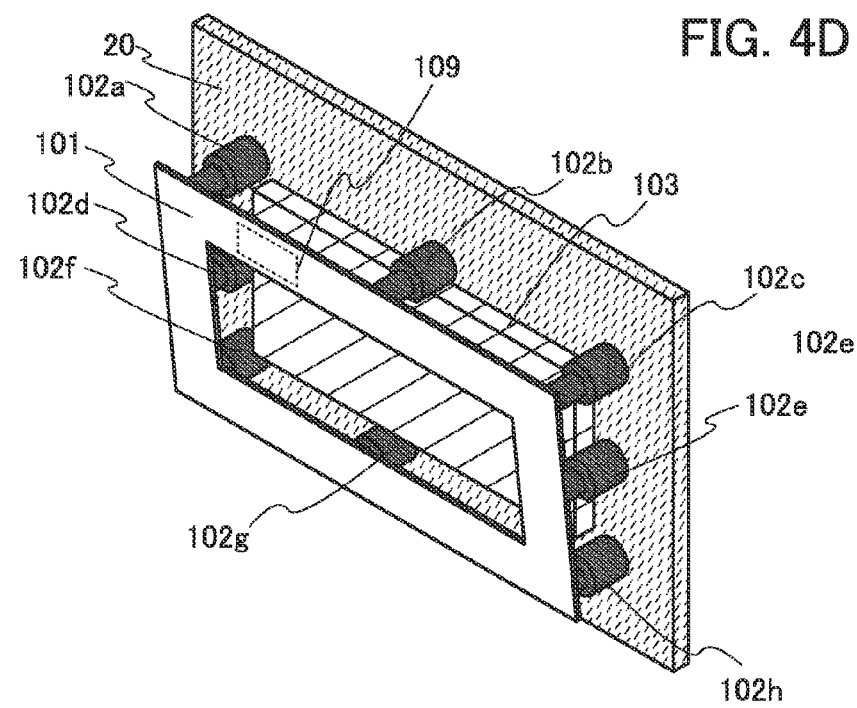
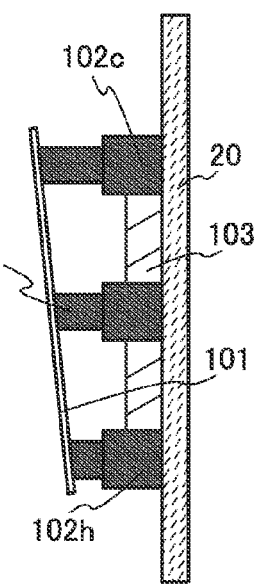

DISPLAY DEVICE AND DISPLAY DEVICE FRAME

BACKGROUND OF THE INVENTION

1. Field of the Invention

One embodiment of the present invention relates to a device such as a display device, a semiconductor device, a light-emitting device, or a liquid crystal display device, and a frame that can be used for the device.

Note that one embodiment of the present invention is not limited to the above technical field. One embodiment of the invention disclosed in this specification and the like relates to an object, a method, and a manufacturing method. In addition, one embodiment of the present invention relates to a process, a machine, manufacture, or a composition of matter. Specifically, examples of the technical field of one embodiment of the present invention disclosed in this specification include a display device, a semiconductor device, a light-emitting device, a power storage device, a storage device, an electronic device, a lighting device, an input device (e.g., a touch sensor), an output device, an input/output device (e.g., a touch panel), a driving method thereof, and a manufacturing method thereof.

2. Description of the Related Art

A variety of display devices ranging from large display devices such as television receivers to small display devices such as cellular phones are put on the market. As higher value added products, display devices capable of displaying stereoscopic images have been actively developed to provide more realistic images.

Physiological factors in recognition of objects as stereoscopic objects by humans are binocular parallax, convergence, focus slide, motion parallax, object size, spatial layout, contrast, shading, and the like.

For example, a display device that displays a stereoscopic image using binocular disparity is known. Such a display device is configured to display, on one screen, an image to be seen from the position of the left eye of a viewer (an image for left eye) and an image to be seen from the position of the right eye of the viewer (an image for right eye). The viewer sees the image for left eye with the left eye and the image for right eye with the right eye and is thus allowed to see a stereoscopic image.

As one example of display devices using eyeglasses, there is a display device which displays an image for left eye and an image for right eye alternately on a screen in synchronization with a shutter provided in eyeglasses, whereby the left eye of a viewer is allowed to see only the image for left eye and the right eye of the viewer is allowed to see only the image for right eye, alternately. Thus, the viewer can see a stereoscopic image.

Furthermore, in a display device using a parallax barrier which allows a viewer to see a stereoscopic image with naked eyes, a screen is divided into a plurality of regions for left eye and a plurality of regions for right eye (e.g., strip-like regions) arranged side by side. A parallax barrier is provided to overlap with the boundaries of the regions. On the divided screen, an image for left eye and an image for right eye are displayed at the same time. With the parallax barrier, the regions for displaying the image for right eye are hidden from the left eye of a viewer and the regions for displaying the image for left eye are hidden from the right eye of the viewer; consequently, the left eye is allowed to see only the image for left eye and the right eye is allowed to see only the image for right eye at the same time. Thus, the viewer can see a stereoscopic image.

Note that a display device including a switchable parallax barrier for achieving switching between a two-dimensional image display mode and a stereoscopic image display mode is known (Patent Document 1).

In addition, a light-emitting element using an electroluminescence (hereinafter also referred to as EL) phenomenon is also known. This light-emitting element is a self-luminous type; therefore, high contrast and high speed of response to an input signal are achieved. Furthermore, a display device to which this light-emitting element is applied and which consumes low power, is manufactured in a simple process, and is easily adapted to the increase in definition and the size of a substrate is known (Patent Document 2).

REFERENCE

Patent Document

[Patent Document 1] PCT International Publication No. WO2004/003630
[Patent Document 2] Japanese Published Patent Application No. 2011-238908

SUMMARY OF THE INVENTION

A display device utilizing eyeglasses with shutters displays images for left eye and images for right eye alternately on a screen, which results in an increase in the frequency of image writing to a pixel portion in one frame period as compared with the case of displaying a two-dimensional image. This requires a driver circuit which can be driven at high frequency and also increases the power consumption of the display device.

In a display device with a parallax barrier, the number of pixels that contribute to image display for left eye and the number of pixels that contribute to image display for right eye in the horizontal direction of a pixel portion are each half of the actual number of the pixels in the horizontal direction of the pixel portion, which prevents high-definition images from being displayed.

Accordingly, it is demanded that a display device can display a two-dimensional image that gives a viewer a strong sense of depth or stereoscopic effect instead of images with binocular disparity such as images for left eye and images for right eye.

It is an object of one embodiment of the present invention to give a viewer a strong stereoscopic effect or sense of depth in a two-dimensional image. Another object of one embodiment of the present invention is to give a viewer a natural stereoscopic effect or sense of depth in a two-dimensional image.

Another object of one embodiment of the present invention is to provide a novel display device. Another object of one embodiment of the present invention is to provide a novel frame that can be used for the display device. Another object of one embodiment of the present invention is to provide a display device that gives a viewer a strong stereoscopic effect or sense of depth in a two-dimensional image or a frame that can be used for a display device and gives a viewer a strong stereoscopic effect or sense of depth in a two-dimensional image. Another object of one embodiment of the present invention is to provide a display device that gives a viewer a natural stereoscopic effect or sense of depth in a two-dimensional image or a frame that can be used for a display device and gives a viewer a natural stereoscopic effect or sense of depth in a two-dimensional image. Another object of one embodiment of the present invention is to provide a display device that gives a viewer less fatigue, and a strong stereoscopic effect or sense of depth in a two-dimensional image or a frame that can be used for a display device and gives a viewer less fatigue, and a strong stereoscopic effect or sense of depth in a two-dimensional image. Another object of one embodiment of the present invention is to provide a display device that gives a viewer less fatigue, and a natural stereoscopic effect or sense of depth in a two-dimensional image or a frame that can be used for a display device gives a viewer less fatigue, and a natural stereoscopic effect or sense of depth in a two-dimensional image.

Note that the description of these objects does not disturb the existence of other objects. In one embodiment of the present invention, there is no need to achieve all the objects. Other objects will be apparent from and can be derived from the description of the specification, the drawings, the claims, and the like.

According to one embodiment of the present invention, a display device includes a frame portion, and a display portion which has a display surface on a frame portion side and which is located so as to be apart from the frame portion with a distance therebetween. The display portion overlaps with an opening of the frame portion, and an end portion of the display portion overlaps with the frame portion.

In this specification, the distance between the frame portion and the display portion corresponds to a distance between the display surface of the display portion and the surface of the frame portion on a viewer side. That is, the distance between the frame portion and the display portion is the sum of the distance between the display surface of the display portion and the surface of the frame portion facing the display surface and the thickness of the frame portion itself (a distance between a surface of the frame portion facing the display surface and a surface of the frame portion on the viewer side). Even when the frame portion and the display portion are in contact with each other, the frame portion and the display portion are located so as to be apart from each other with a distance therebetween by the thickness of the frame portion.

In the above display device, it is preferable that a corner of an inner frame of the frame portion preferably have curvature.

In the above display device, it is preferable that the corner of the inner frame of the frame portion have larger curvature than a corner of the display portion.

In the above display device, it is preferable that the curvature of the corner of the inner frame of the frame portion be variable.

In the above display device, it is preferable that the size of the inner frame of the frame portion be variable.

In the above display device, it is preferable that the frame portion be attachable and detachable to and from the display portion freely.

In the above display device, it is preferable that the frame portion be curved with respect to the display surface (or the display portion).

In the above display device, the frame portion and the display portion are preferably not parallel to each other.

In the above display device, the frame portion may have a light-blocking property.

According to another embodiment of the present invention, a display device frame includes a frame portion whose inner frame is variable in size, an arithmetic processing portion which is supplied with image data and which can supply a control signal, and a drive control portion which is supplied with the control signal and which can change the size of the inner frame. The arithmetic processing portion generates the control signal by analyzing the image data.

Note that although the display device frame includes the drive control portion for changing the size of the inner frame, the display device frame of one embodiment of the present invention is not limited thereto. According to one embodiment of the present invention, the drive control portion can change at least one of the size of the inner frame, the degree of a curvature of the frame portion, the degree of an inclination of the frame portion, the shape of the inner frame of the frame portion, and the like.

According to one embodiment of the present invention, a viewer can have a strong stereoscopic effect or sense of depth in a two-dimensional image. According to one embodiment of the present invention, a viewer can have a natural stereoscopic effect or sense of depth in a two-dimensional image.

According to one embodiment of the present invention, a novel display device can be provided. According to one embodiment of the present invention, a novel frame that can be used for a display device can be provided. According to one embodiment of the present invention, a display device that gives a viewer a strong stereoscopic effect or sense of depth in a two-dimensional image or a frame that can be used for a display device and gives a viewer a strong stereoscopic effect or sense of depth in a two-dimensional image can be provided. According to one embodiment of the present invention, a display device that gives a viewer a natural stereoscopic effect or sense of depth in a two-dimensional image or a frame that can be used for a display device and gives a viewer a natural stereoscopic effect or sense of depth in a two-dimensional image can be provided. According to one embodiment of the present invention, a display device that gives a viewer less fatigue, and a strong stereoscopic effect or sense of depth in a two-dimensional image or a frame that can be used for a display device and gives a viewer less fatigue, and a strong stereoscopic effect or sense of depth in a two-dimensional image can be provided. According to one embodiment of the present invention, a display device that gives a viewer less fatigue, and a natural stereoscopic effect or sense of depth in a two-dimensional image or a frame that can be used for a display device and gives a viewer less fatigue, and a natural stereoscopic effect or sense of depth in a two-dimensional image can be provided.

Note that the description of these effects does not disturb the existence of other effects. One embodiment of the present invention does not necessarily achieve all the objects listed above. Other effects will be apparent from and can be derived from the description of the specification, the drawings, the claims, and the like.

BRIEF DESCRIPTION OF THE DRAWINGS

FIGS. 1A and 1B illustrate an example of a display device.
FIGS. 4A to 4D illustrate examples of a display device.

DETAILED DESCRIPTION OF THE INVENTION

Figure 2A:
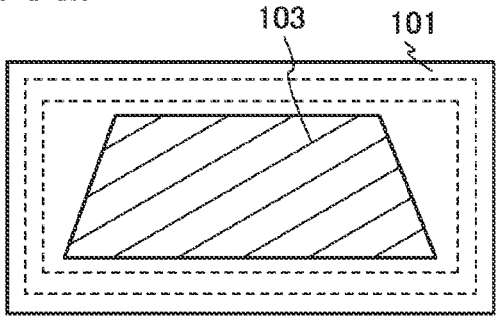
FIGS. 2A to 2G illustrate examples of a display device.
Figure 2B:
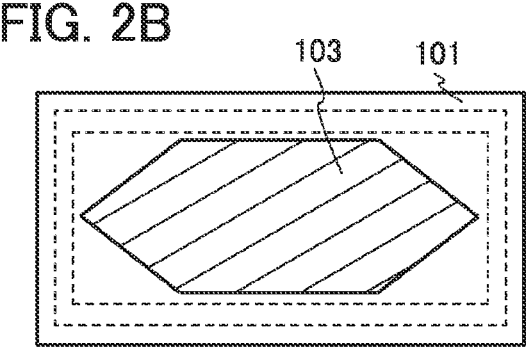

Embodiment will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiment below.

Note that in the structures of the invention described below, the same portions or portions having similar functions are denoted by the same reference numerals in different drawings, and description of such portions is not repeated. Furthermore, the same hatching pattern is applied to portions having similar functions, and the portions are not especially denoted by reference numerals in some cases.

In addition, the position, size, range, or the like of each structure illustrated in drawings and the like is not accurately represented in some cases for easy understanding. Therefore, the disclosed invention is not necessarily limited to the position, the size, the range, or the like disclosed in the drawings and the like.

A display device of one embodiment of the present invention will be described below with reference to FIGS. 1A and 1B, FIGS. 2A to 2G, FIGS. 3A to 3F, FIGS. 4A to 4D, FIGS. 5A and 5B, FIGS. 6A and 6B, FIGS. 7A to 7C, FIGS. 8A to 8C, and FIGS. 9A to 9C.

According to one embodiment of the present invention, a display device includes a frame portion, and a display portion which has a display surface on a frame portion side and which is located so as to be apart from the frame portion with a distance therebetween. The display portion overlaps with an opening of the frame portion, and an end portion of the display portion overlaps with the frame portion.

The display device of one embodiment of the present invention includes the frame portion between a viewer and the display portion, whereby the viewer has an optical illusion that the position of the display portion is different from actual one, stereoscopic information is corrected by brain, and thus the viewer can feel a stereoscopic effect or a sense of depth in a two-dimensional image.

When the degree of a curvature or an inclination of the frame portion, the shape or the size of the opening of the frame portion, or the like is constant in the display device, a problem might be caused. For example, the way a viewer feels a stereoscopic effect or a sense of depth differs depending on a viewer, and an appropriate range of conditions such as the degree of a curvature or an inclination of the frame portion, the shape or the size of the opening of the frame portion, and the like might vary among individuals. In the case where these conditions are not suitable for a viewer, the viewer cannot feel easily a stereoscopic effect or a sense of depth in a two-dimensional image in some cases even by viewing the display portion through the opening of the frame portion. In contrast, when the stereoscopic effect or sense of depth is too strong, loads of the brain or eyes become high and accordingly the viewer might have severe strain. Furthermore, depending on an image displayed on the display portion, the intensity of a stereoscopic effect or a sense of depth might be changed without intent or might not be changed though intended to be changed.

Thus, in the display device of one embodiment of the present invention, at least any one of a curvature of the frame portion, an inclination of the frame portion, the shape of the opening of the frame portion, the size of the frame portion, and the like is variable. Accordingly, the frame portion can be adjusted so that a viewer can feel a natural stereoscopic effect and can feel less fatigue. In addition, by adjusting the frame portion depending on an image displayed on the display portion, a change of the intensity of a stereoscopic effect or a sense of depth without intent can be suppressed or the intensity of a stereoscopic effect or a sense of depth can be changed intentionally. Accordingly, in the display device of one embodiment of the present invention, a viewer can feel a strong stereoscopic effect or sense of depth in a two-dimensional image and can feel less fatigue.

Note that the frame portion may be controlled by a viewer himself/herself or may be automatically controlled by the display device or the frame portion. In addition, a curvature of the frame portion, an inclination of the frame portion, the shape of the opening of the frame portion, or the size of the frame portion may be changed while an image is reproduced in the display portion. Alternatively, the curvature of the frame portion, the inclination of the frame portion, the shape of the opening of the frame portion, or the size of the frame portion may be constant while reproducing an image and can be changed while not operating.

A positional relation between the display portion and the frame portion of the display device of one embodiment of the present invention is described with a perspective view of a display device illustrated in FIG. 1A and a front view (a view viewed from the display surface side) and a top view of the display device illustrated in FIG. 1B.

The display device in FIGS. 1A and 1B includes a display panel 10 having a display portion 103 and a frame portion 101. The display portion 103 includes a display surface on the frame portion 101 side. The display portion 103 and the frame portion 101 are located so as to be apart from each other with a distance L therebetween. The display portion 103 overlaps with an opening of the frame portion 101, and an end portion of the display portion 103 overlaps with the frame portion 101.

In this specification, the distance between the frame portion 101 and the display portion 103 corresponds to a distance between the display surface of the display portion 103 and the surface of the frame portion 101 on a viewer side. That is, the distance between the frame portion 101 and the display portion 103 is the sum of the distance between the display surface of the display portion 103 and the surface of the frame portion 101 facing the display surface and the thickness of the frame portion 101 itself (a distance between a surface of the frame portion 101 facing the display surface and a surface of the frame portion 101 on the viewer side). Even when the frame portion 101 and the display portion 103 are in contact with each other, the frame portion 101 and the display portion 103 are located so as to be apart from each other with a distance therebetween by the thickness of the frame portion 101.

For example, the distance L between the frame portion 101 and the display portion 103 is 1 mm or more, preferably 1 cm or more, further preferably 5 cm or more, in which case a viewer can feel a strong stereoscopic effect or sense of depth in a two-dimensional image.

Although the distance between the frame portion 101 and the display portion 103 might differ depending on the position in the display portion 103, such as the end portion or the center portion of the display portion 103, the distance is at least greater than 0, preferably 1 mm or more in part of the display portion 103. In particular, the minimum distance between the display surface of the display portion 103 and the surface of the frame portion 101 on the viewer side is 1 cm or more, preferably 5 cm or more, in which case a viewer can feel a strong stereoscopic effect or sense of depth in a two-dimensional image which is displayed on the entire surface of the display portion.

FIG. 1B illustrates the case where four sides of the display portion 103 overlap with the frame portion 101. According to one embodiment of the present invention, without limitation to such a structure, at least part of the display portion 103 may overlap with the frame portion 101. For example, only two sides of the display portion 103 facing each other may overlap with the frame portion 101.

In addition, FIG. 1B illustrates the case where a long side W1 of the display portion 103 is longer than a long side W2 of the opening of the frame portion 101, and a short side of the display portion 103 is longer than a short side of the opening of the frame portion 101. According to one embodiment of the present invention, without limitation to such a structure, either a long side or a short side of the display portion 103 may be longer than that of the opening of the frame portion 101, for example.

Moreover, even when the proportion of display in the display portion that is visible for a viewer is less than 50%, the viewer can feel a stereoscopic effect or a sense of depth. However, in some cases, the viewer grasps the entire display with difficulty, views the display unnaturally, or feels strong fatigue. Thus, it is preferable that a viewer who faces the display surface of the display device can view 50% or more, preferably 70% or more, further preferably 90% or more of display in the display portion through the opening of the frame portion.

A viewer of the display device (see a right eye 30R and a left eye 30L in FIG. 1B) views a two-dimensional image (a still image or a moving image) displayed on the display portion 103 through the opening of the frame portion 101. The viewer can feel a strong stereoscopic effect or sense of depth in the two-dimensional image by viewing display in the display portion 103 through the opening of the frame portion 101 as compared with the case of viewing display in the display portion 103 without through the opening of the frame portion 101.

The viewer can feel a strong stereoscopic effect or sense of depth in a two-dimensional image even when viewing the display portion 103 with one eye. The viewer can feel a stronger stereoscopic effect or sense of depth in a two-dimensional image by viewing the display portion 103 with both eyes and feeling a difference between information that comes into the right eye and information that comes into the left eye.

Note that the frame portion 101 may be attachable and detachable freely. The display device can be used without the frame portion 101 when display which does not require a stereoscopic effect or a sense of depth is made on the display portion 103. In addition, a plurality of attachable and detachable frame portions 101 whose openings differ in size, shape, or the like may be prepared and the frame portions 101 may be replaced with each other.

FIGS. 2A to 2G illustrate examples of the shape of the inner frame of the frame portion in one embodiment of the present invention. The shape of the inner frame of the frame portion 101 may be similar to or different from that of the display portion 103. For example, when the display portion 103 is in the shape of a rectangle, the inner frame of the frame portion 101 may be in the shape of a rectangle, a polygon other than a rectangle, such as a trapezoid (FIG. 2A) or a hexagon (FIG. 2B), a circle, an ellipse (FIG. 2C), or the like.

Figure 2C:
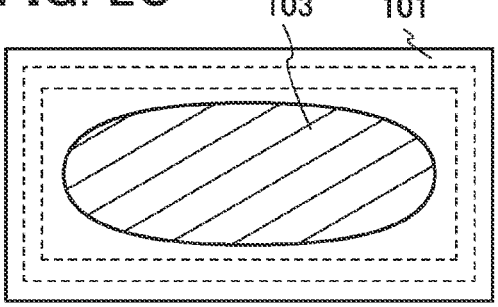
Figure 2D:
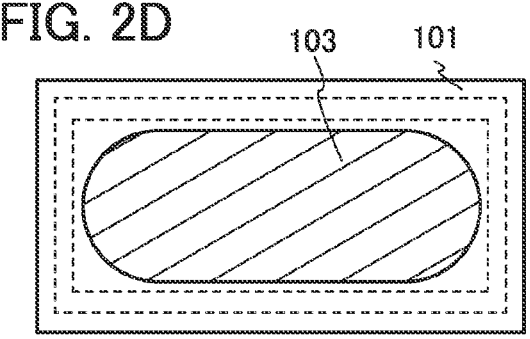
Figure 2E:
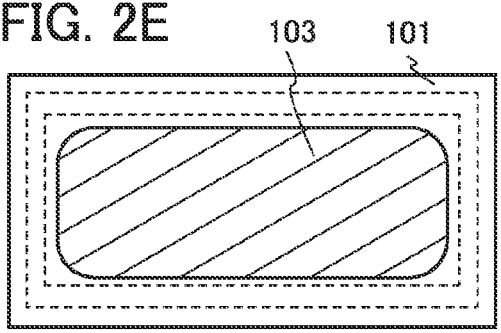

Moreover, corners of the inner frame of the frame portion 101 preferably have curvature as illustrated in FIGS. 2C to 2E because a viewer can feel a strong stereoscopic effect or sense of depth in a two-dimensional image. In addition, the corners of the inner frame of the frame portion 101 preferably have curvature because naturalness of a two-dimensional image is enhanced for the viewer in some cases. In particular, the corners of the inner frame of the frame portion 101 preferably have larger curvature than the corners of the display portion 103.

When the curvature of the corners is large, a region of the display portion 103 that is visible for the viewer gets narrower, accordingly, the curvature is preferably set such that a straight portion is included in a side of the inner frame of the frame portion 101 as illustrated in FIG. 2D and further preferably the curvature is set such that a straight portion is included in each side of the inner frame of the frame portion 101 as illustrated in FIG. 2E.

For example, a frame portion in which the curvature of the corner of the inner frame is variable can be achieved with the use of an elastic material such as rubber. For example, by adjusting the inner frame of the frame portion to any of the shapes illustrated in FIGS. 2C to 2E depending on an image displayed on the display portion, an change of the intensity of a stereoscopic effect or a sense of depth without intent can be suppressed or the intensity of a stereoscopic effect or a sense of depth can be changed intentionally.

Figure 2F:
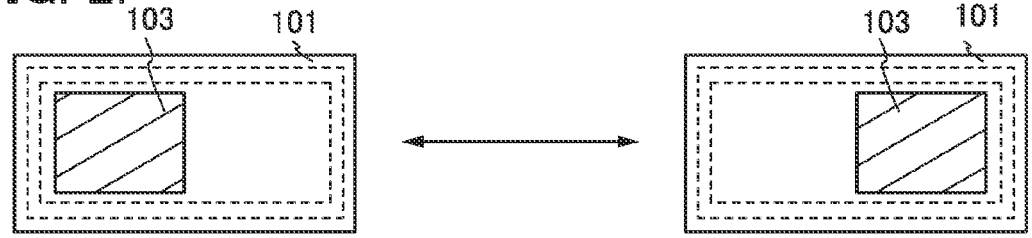
Figure 2G:
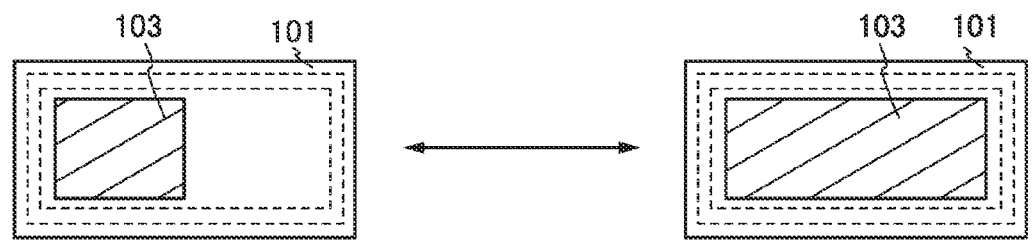

The position of the opening of the frame portion 101 may be moved as illustrated in FIG. 2F. The size of the opening of the frame portion 101 may be variable as illustrated in FIG. 2G. For example, by adjusting the size or the position of the opening of the frame portion depending on an image displayed on the display portion, a change of the intensity of a stereoscopic effect or a sense of depth without intent can be suppressed or the intensity of a stereoscopic effect or a sense of depth can be changed intentionally.

FIGS. 3A to 3F illustrate examples of the shape of the frame portion of one embodiment of the present invention.

Figure 3A:
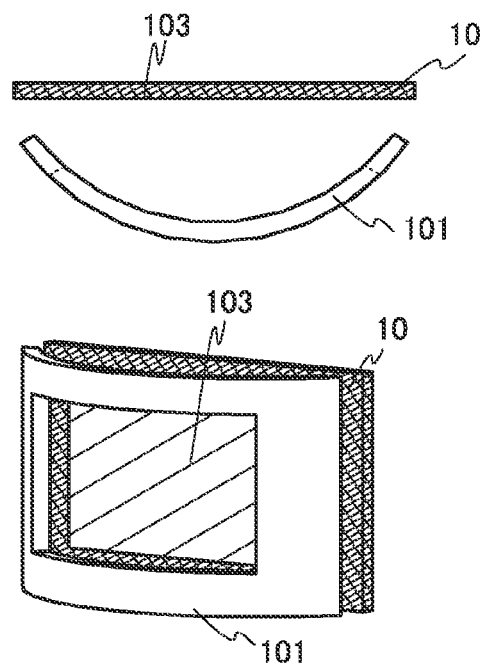
FIGS. 3A to 3F illustrate examples of a display device.
Figure 3B:
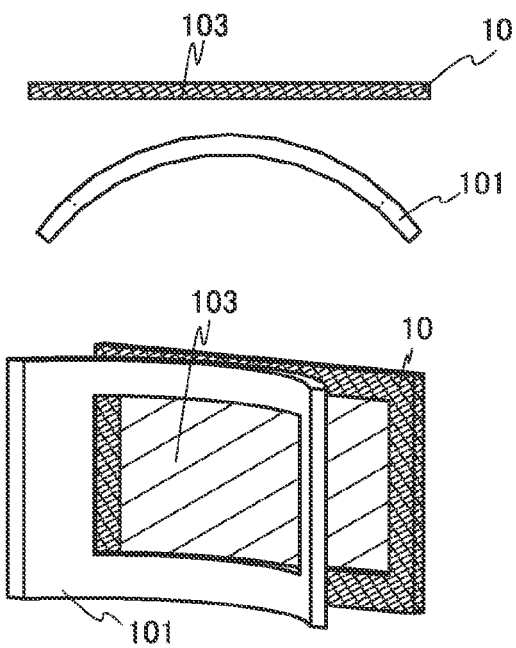
Figure 3C:
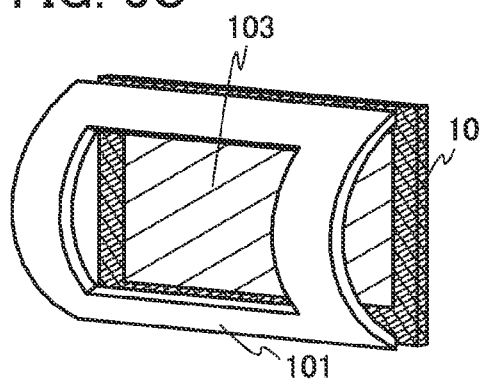
Figure 3D:
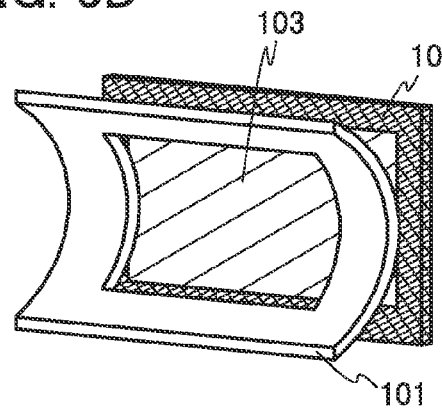

According to one embodiment of the present invention, the frame portion may be curved. The frame portion 101 illustrated in FIG. 3A is bent in a horizontal direction (here, in a major-axis direction of the display portion 103) and includes a convex surface (a convex curved surface) on a viewer side. The frame portion 101 illustrated in FIG. 3B is bent in a horizontal direction and includes a concave surface (a concave curved surface) on a viewer side. The frame portion 101 illustrated in FIG. 3C is bent in a vertical direction (here, in a minor-axis direction of the display portion 103) and includes a convex surface on a viewer side. The frame portion 101 illustrated in FIG. 3D is bent in a vertical direction and includes a concave surface on a viewer side.

In any of the structures in FIGS. 3A to 3D, a viewer can feel a strong stereoscopic effect or sense of depth in a two-dimensional image. In particular, a stereoscopic effect or a sense of depth in a horizontal direction is stronger than that in a vertical direction. This is probably because a difference between information that enters a right eye and information that enters a left eye of a viewer can be made large. In addition, a stereoscopic effect or a sense of depth of a display device including a convex surface on a viewer side is stronger than that of a display device including a concave surface.

Figure 3E:
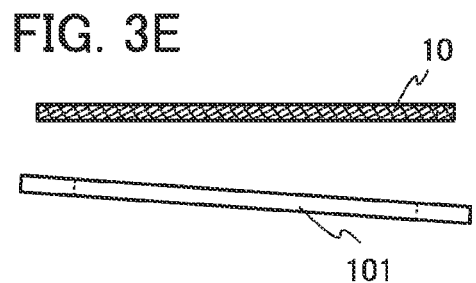
Figure 3F:
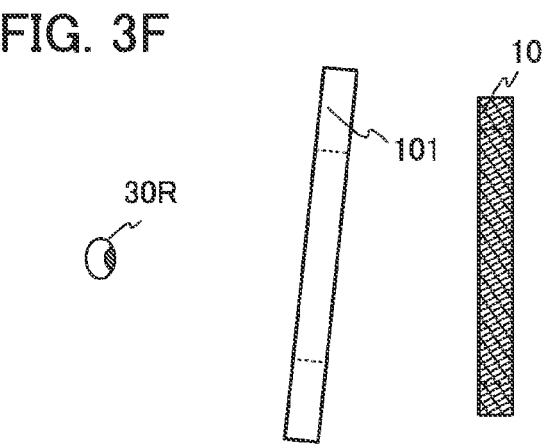

According to one embodiment of the present invention, the frame portion is not necessarily parallel to the display surface (or the display portion). For example, FIG. 3E illustrates the case where a distance between the frame portion 101 and the display portion (display panel 10) gets wider toward the right end of the display portion, and FIG. 3F illustrates the case where the distance between the frame portion 101 and the display portion (display panel 10) gets wider toward the lower end of the display portion. In some favorable cases, a viewer can feel a stronger stereoscopic effect or sense of depth in a two-dimensional image when the frame portion 101 has an inclination with respect to the display surface (or the display portion).

FIGS. 4A to 4D illustrate a display device of one embodiment of the present invention.

FIGS. 4A and 4B illustrate an example of the case where the frame portion 101 is not parallel to the display portion 103. FIG. 4A is a top view of a display device and FIG. 4B is a perspective view of the display device.

FIGS. 4C and 4D illustrate another example of the case where the frame portion 101 is not parallel to the display portion 103. FIG. 4C is a perspective view of the display device and FIG. 4D is a side view of the display device.

The display device in FIGS. 4A to 4D includes the display portion 103 and the frame portion 101. The display portion 103 includes a display surface on the frame portion 101 side. The display portion 103 and the frame portion 101 are located so as to be apart from each other with a distance therebetween. An incline or a convex/concave of the frame portion 101 with respect to the display portion 103 can be adjusted in accordance with the lengths of driver portions 102a to 102h fixed to a structure body 20. The display portion 103 overlaps with an opening of the frame portion 101, and an end portion of the display portion 103 overlaps with the frame portion 101.

Although examples in which the display device includes eight driver portions are illustrated in FIGS. 4A to 4D, one embodiment of the present invention is not limited thereto. For example, the display device may have no driver portion, or the number of driver portions may be one to seven or nine or more. A plurality of driver portions may be driven independently or may be driven in synchronization with each other.

Note that the frame portion 101 or the driver portions 102a to 102h may be attachable and detachable freely.

Note that the driver portions 102a to 102h and the frame portion 101 may be attached to a member of the display device, such as the display panel, or may be attached to a wall surface or a floor on which the display device is disposed. That is, the structure body 20 may be included or may not be included in the display device.

FIGS. 4A and 4B illustrate the case where a distance between the frame portion 101 and the display portion 103 gets wider toward the left end of the display portion, and FIGS. 4C and 4D illustrate the case where the distance between the frame portion 101 and the display portion 103 gets wider toward the upper end of the display portion.

The display device in FIGS. 4A to 4D includes a processing portion 109. For example, the inclination of the frame portion 101 with respect to the display portion 103 can be changed in accordance with the content of a moving image by having the processing portion 109. Accordingly, such a case is preferable because a viewer can feel a strong stereoscopic effect or sense of depth in a two-dimensional image.

Specifically, for example, when a moving image in which a moving object approaches forward diagonally from the left side to the right side is displayed, the frame portion 101 may be moved in such a manner that the distance between the frame portion 101 and the display portion 103 gets wider toward the right end so that especially the right end of the frame portion 101 approaches toward a viewer.

Figure 5A:
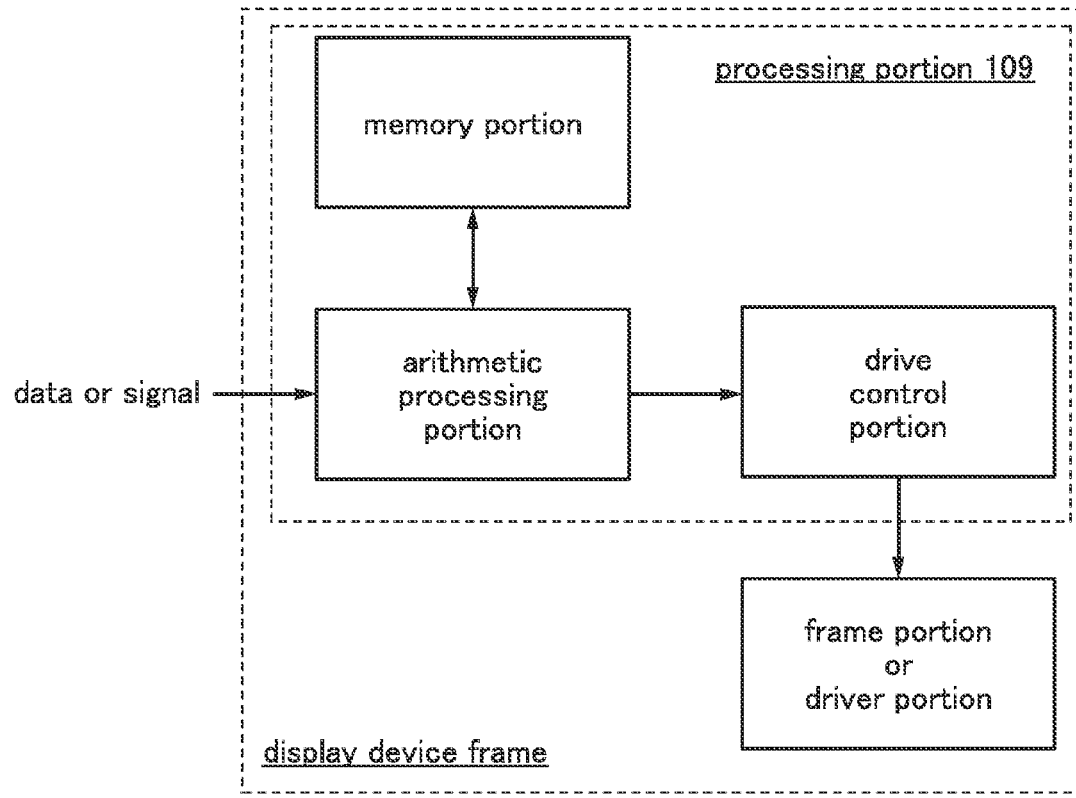
FIGS. 5A and 5B illustrate examples of a display device frame and a display device.
Figure 5B:
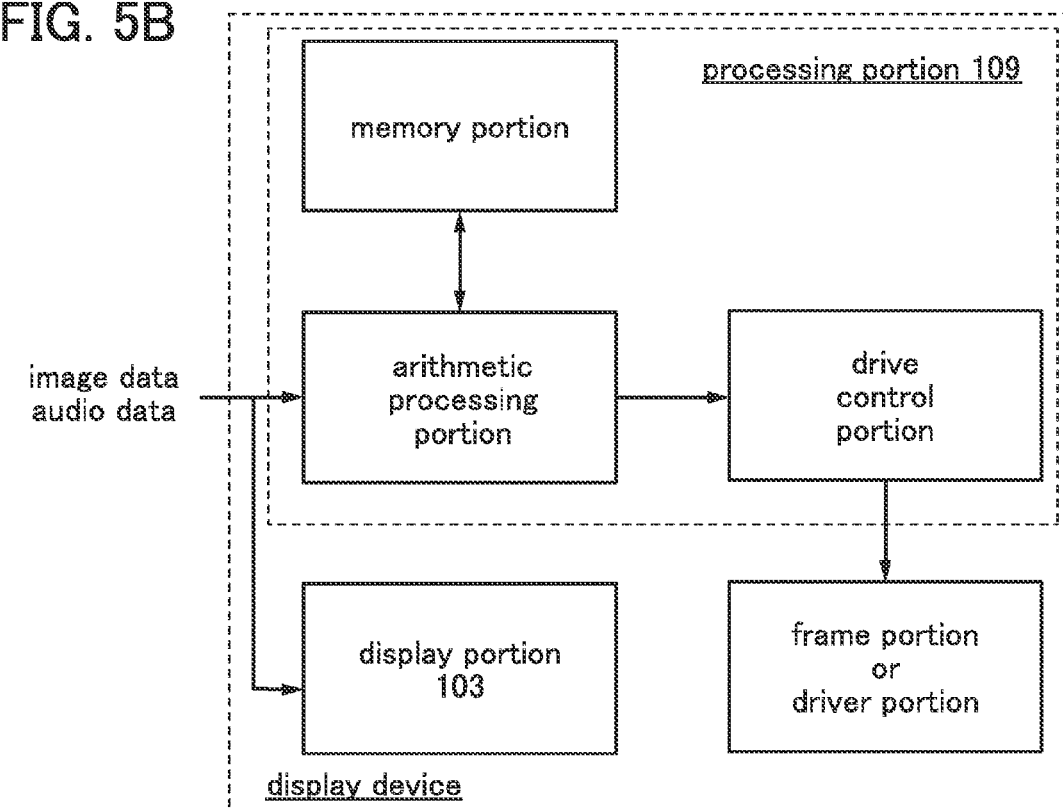

Structure examples of the display device frame and the display device each having the processing portion 109 are shown in FIGS. 5A and 5B. Note that the display device frame may be attached to the display panel or may be worn on the head of a viewer.

The processing portion 109 includes an arithmetic processing portion, a memory portion, and a drive control portion shown in FIGS. 5A and 5B.

An image data displayed on the display portion 103 is supplied to the arithmetic processing portion. The arithmetic processing portion generates a control signal by analyzing the supplied image data.

As the analysis of the image data, spectrum analysis (content analysis) and detection of expansion or movement (zoom-in/zoom-out, pan tilt (panning), the speed of movement, the direction of movement, or the like) can be given.

In the case where an audio data is supplied to the arithmetic processing portion, a control signal may be generated by analyzing the supplied audio data. Alternatively, a control signal may be generated on the basis of the analysis results of both the image data and the audio data.

As the analysis of the audio data, spectrum analysis (content analysis), sound source analysis, and separate extraction of music, human voice, or the like can be given.

Furthermore, as a result of detecting a focal length or a sight line of a viewer or evaluating sensitivity of a stereoscopic effect, fatigue, or the like of the viewer when the viewer views the display portion, data of the results are supplied to the arithmetic portion, in which case a control signal may be generated by analyzing the data.

For example, in sensitivity evaluation carried out in advance, it is examined which of the frame portion inclined with respect to the display portion and the frame portion curved with respect to the display portion gives a stronger stereoscopic effect to each of a plurality of viewers. Each viewer selects own data obtained in the sensitivity evaluation when using the display device. As a result, a control signal generated by analyzing the data in the arithmetic processing portion is supplied from the arithmetic processing portion to the drive control portion. Then, the drive control portion moves or transforms the frame portion so that the frame portion is inclined with respect to the display portion or curved with respect to the display portion on the basis of the control signal from the arithmetic processing portion.

In addition, the viewer can select the intensity and existence of a stereoscopic effect, the degree of a curvature or an inclination of the frame portion, or the shape, the size, or the like of an inner frame of the frame portion, and a signal based on the selection may be supplied to the arithmetic processing portion. In the arithmetic processing portion, a control signal based on the signal may be generated.

In the memory portion, data used for an arithmetic operation in the arithmetic processing portion, arithmetic results, or the like can be stored.

A control signal generated in the arithmetic processing portion is supplied to the drive control portion, and the frame portion can be controlled on the basis of the control signal. The frame portion may be moved directly or may be moved indirectly by moving the driver portion.

Figure 6A:
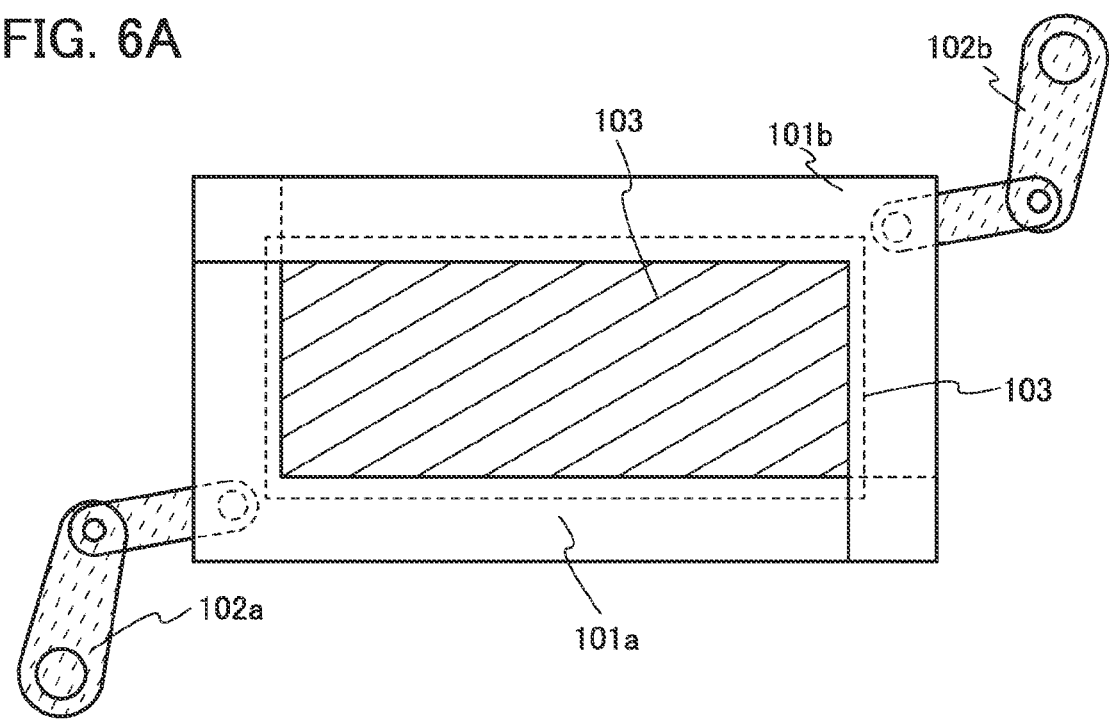
FIGS. 6A and 6B illustrate an example of a display device.
Figure 6B:
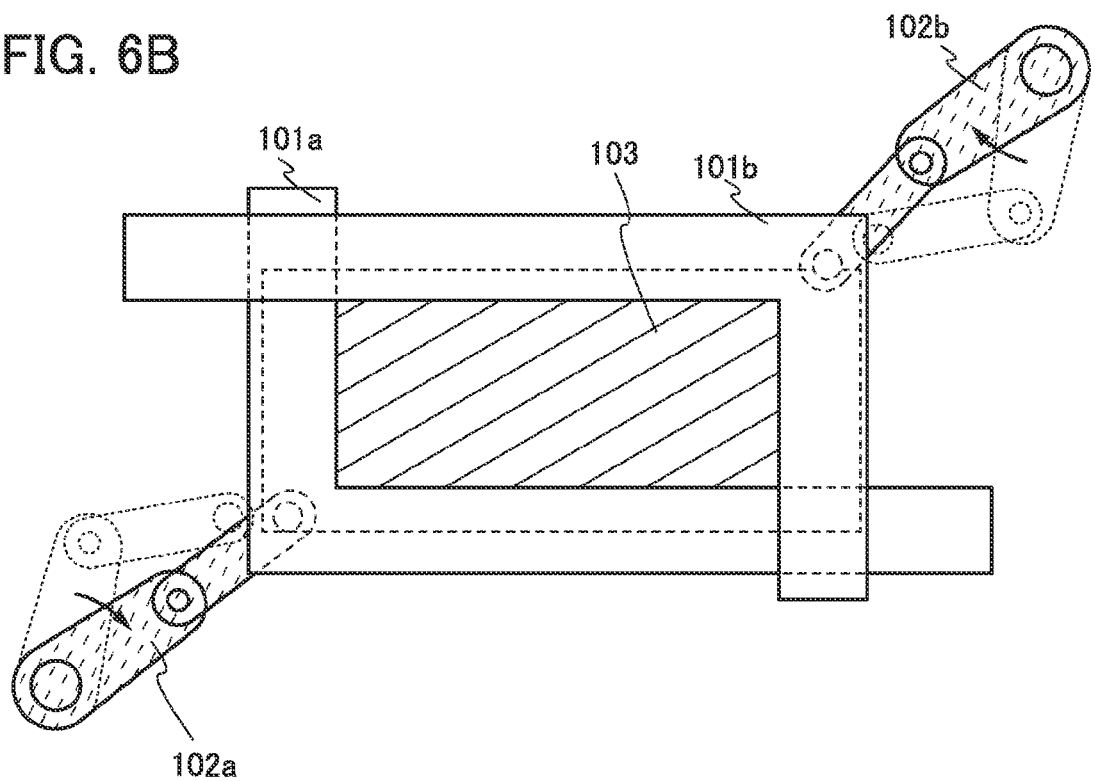

FIGS. 6A and 6B illustrate a display device of another embodiment of the present invention.

A display device illustrated in FIGS. 6A and 6B includes a frame portion and the display portion 103. The frame portion includes a first frame portion 101a and a second frame portion 101*b*. The display portion 103 overlaps with an opening surrounded by the first frame portion 101*a* and the second frame portion 101*b* and end portions of the display portion 103 overlap with the first frame portion 101*a* and the second frame portion 101*b*.

The first frame portion 101*a* and the second frame portion 101*b* are moved by driver portions 102*a* and 102*b* so that the size of the inner frame of the frame portion can be changed.

For the display device or the frame portion in FIGS. 6A and 6B, the above display device and display device frame (see FIGS. 5A and 5B) may be employed.

Figure 7A:
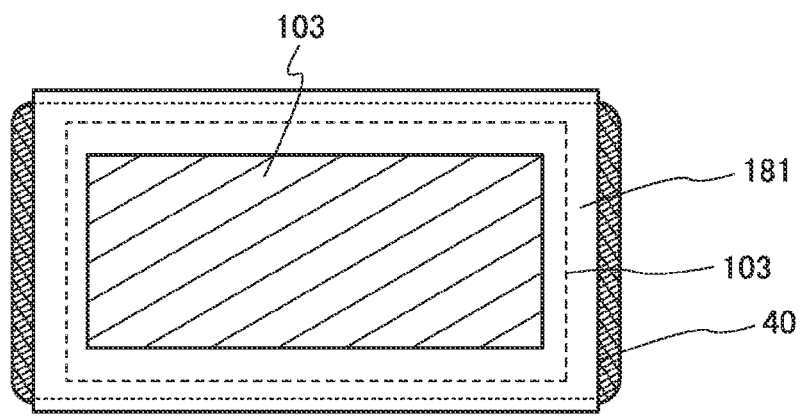
FIGS. 7A to 7C illustrate examples of a display device.
Figure 7B:
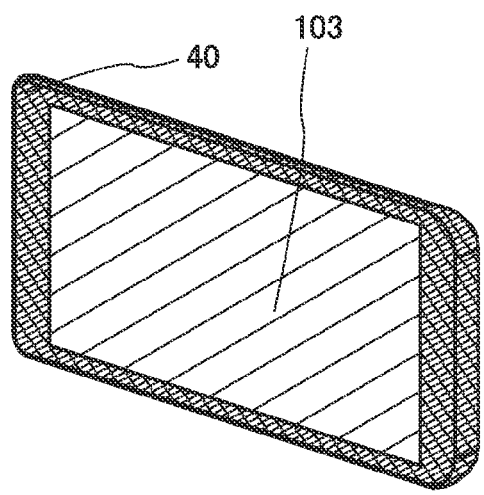
Figure 7C:
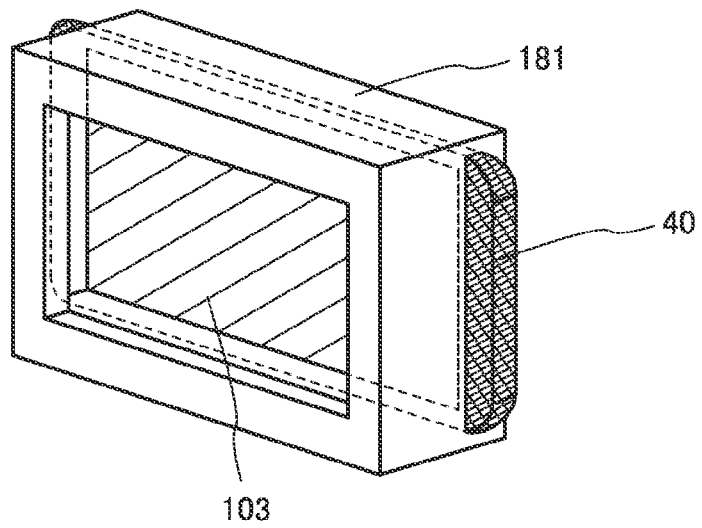

FIGS. 7A to 7C illustrate a display device of one embodiment of the present invention and a display panel included in the display device.

A display device illustrated in FIG. 7A includes a frame portion 181 and a display panel 40. The display panel 40 (see FIG. 7B) includes the display portion 103. The display portion 103 overlaps with an opening of the frame portion 181 and an end portion of the display portion 103 overlaps with the frame portion 181.

As illustrated in FIG. 7C, the display panel 40 can fit inside the frame portion 181. The display panel 40 and the frame portion 181 may be integrated with each other, or the display panel 40 may be able to be taken out from the frame portion 181 and used independently of the frame portion 181.

Figure 8A:
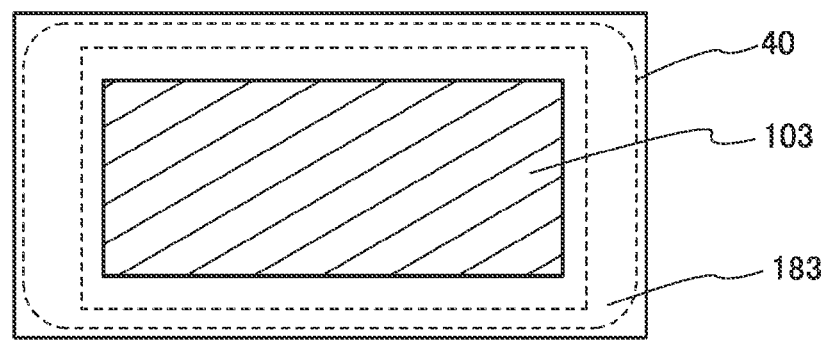
FIGS. 8A to 8C illustrate examples of a display device.
Figure 8B:
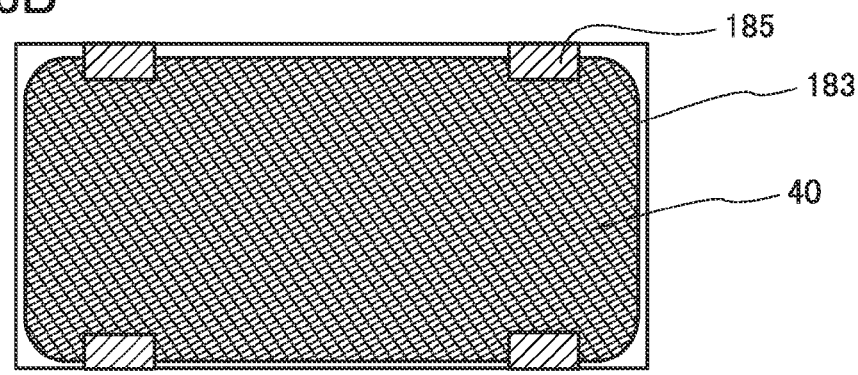
Figure 8C:
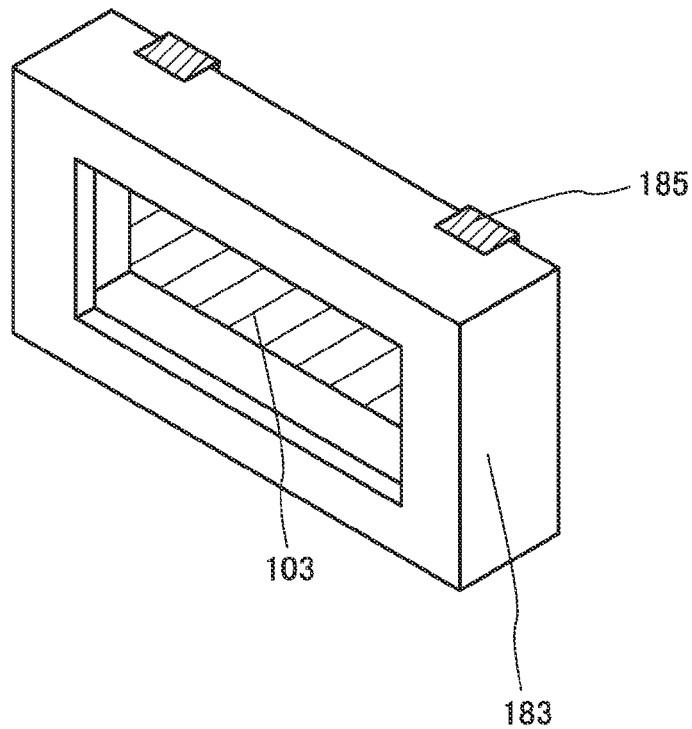

FIGS. 8A to 8C illustrate a display device of another embodiment of the present invention.

A display device illustrated in FIGS. 8A to 8C includes an attachable and detachable frame portion 183 and the display panel 40. The display panel 40 (see FIG. 7B) includes the display portion 103.

As illustrated in FIG. 8C, the frame portion 183 can be attached to the display panel 40 with a hinge 185 (or a hook).

Figure 9A:
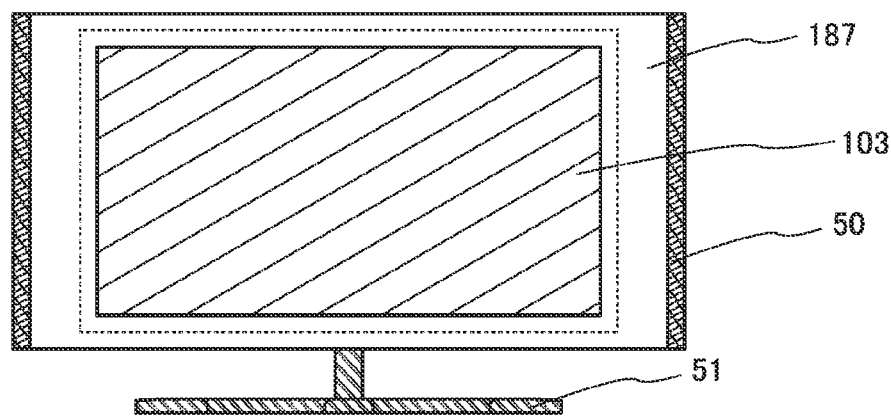
FIGS. 9A to 9C illustrate an example of a display device.
Figure 9B:
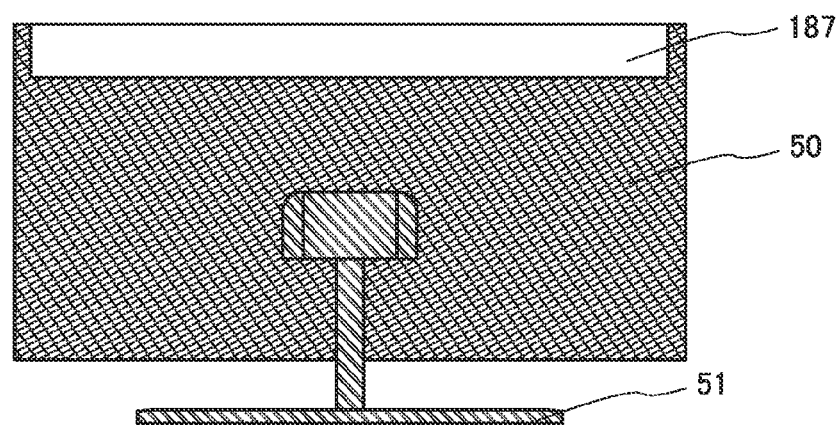
Figure 9C:
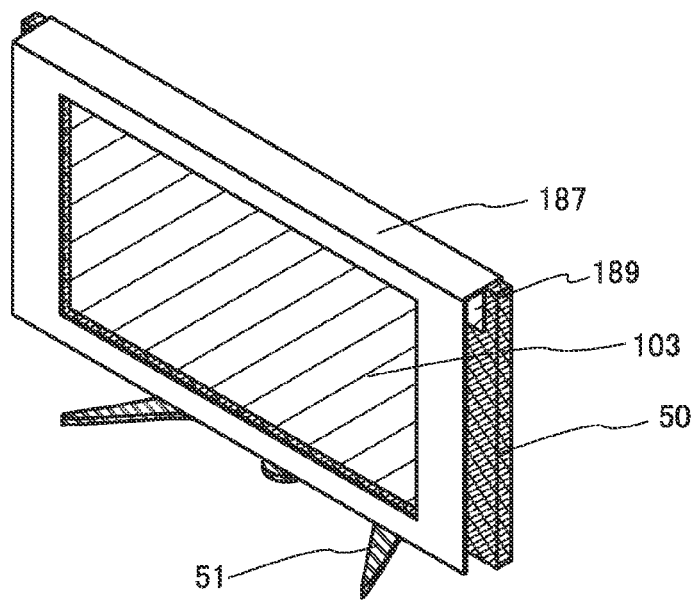

FIGS. 9A to 9C illustrate a display device of another embodiment of the present invention.

A display device illustrated in FIGS. 9A to 9C includes an attachable and detachable frame portion 187, a display panel 50, and a support body 51. The display panel 50 includes the display portion 103.

As illustrated in FIG. 9C, the frame portion 187 can be attached to the display panel 50 with a hinge 189.

Furthermore, the display device of the embodiment of the present invention has a frame portion, whereby glare of external light to the display portion can be suppressed. By suppressing glare of external light, not only color reproducibility of display is enhanced but also the viewer can feel a strong stereoscopic effect or sense of depth in a two-dimensional image.

<Frame Portion>

The opening of the frame portion may have at least a light-transmitting property that allows a viewer to see display in the display portion, or the opening may also be a space. Alternatively, a plate, a film, or the like made of a material transmitting visible light, such as glass or resin, may overlap with the display portion.

Display that can be viewed through a frame portion is unclear as compared with display that can be viewed through an opening of the frame portion. The frame portion may be formed using a light-transmitting material such as ground glass or frosted glass. The frame portion may have a light-blocking property that makes a viewer difficult to see the display portion through the frame portion or may be formed using a material that does not transmit visible light.

There is no particular limitation on the material used for the frame portion. For example, a material such as glass, quartz, ceramics, sapphire, metal, an organic resin, paper, or wood can be used. The frame portion is preferably formed using a flexible material, in which case the frame portion can be bent.

There is no particular limitation on the color of the frame portion. For example, the frame portion may be black, white, blue, green, red, or the like. Black is preferable to enhance how immersed in display content a viewer is.

<Display Portion>

The display device of the embodiment of the present invention may include at least a display portion capable of displaying an image in a plane. Note that an image in this specification may be either a still image or a moving image.

For example, as the display portion, sheet-like or plate-like members of paper, cloth, a resin film, wood, and the like on which various images such as a picture, a painting, and an illustration are displayed can be given.

The display portion may include a display element. As an example of the display portion or a display element of the display portion, an EL element (e.g., an EL element including organic and inorganic materials, an organic EL element, or an inorganic EL element), an LED (e.g., a white LED, a red LED, a green LED, or a blue LED), a transistor (a transistor which emits light in accordance with current), an electron emitter, a liquid crystal element, electronic ink, an electrophoretic element, a grating light valve (GLV), a plasma display panel (PDP), a display element including a micro electro mechanical system (MEMS), a digital micromirror device (DMD), a digital micro shutter (DMS), an interferometric modulator (IMOD) element, a MEMS shutter display element, an optical interference type MEMS display element, an electrowetting element, a piezoelectric ceramic display, or a carbon nanotube, which are display media whose contrast, luminance, reflectivity, transmittance, or the like is changed by electromagnetic action. As an example of a display portion having an EL element, an EL display or the like can be given. As an example of a display portion including an electron emitter, a field emission display (FED), an SED-type flat panel display (SED: surface-conduction electron-emitter display), or the like can be given. As an example of a display portion including a liquid crystal element, a liquid crystal display (e.g., a transmissive liquid crystal display, a semi-transmissive liquid crystal display, a reflective liquid crystal display, a direct-view liquid crystal display, a projection liquid crystal display), or the like can be given. As an example of a display portion including electronic ink or electrophoretic element, electronic paper or the like can be given.

Note that when the display portion is an organic EL display, a viewer tends to feel a strong stereoscopic effect or sense of depth in a two-dimensional image as compared with a liquid crystal display. Therefore, in the embodiment of the present invention, an organic EL display is preferably used for the display portion.

Alternatively, the display portion may be a screen on which an image is projected by a projection device.

The display portion of the display device of the embodiment of the present invention or the display device of the embodiment of the present invention may be an electronic device such as television sets (also called TV or television receivers); monitors for computers or the like; digital photo frames; mobile phones (also called cellular phones or portable telephones); portable game machines; portable information terminals; audio playback devices; or large game machines such as pachinko machines. That is, according to the embodiment of the present invention, a frame portion may be added to an electronic device (corresponding to the display portion), or the frame portion may be included in an electronic device (corresponding to the display device). Alternatively, the above electronic device may include the display device of the embodiment of the present invention.

The display device of the embodiment of the present invention can be used in an amusement park (e.g., a game center, a theme park, or the like), a theater, a cinema, or the like. For example, in accordance with the content of attraction, a viewer can feel a strong stereoscopic effect or sense of depth in a two-dimensional image in such a manner that the frame portion is transformed, or the degree of a curvature or an inclination of the frame portion or the shape or the size of the opening of the frame portion is changed.

As described above, in the display device of the above embodiment of the present invention, a viewer can feel a strong stereoscopic effect or sense of depth in a two-dimensional image with a frame portion between the viewer and the display portion. Moreover, in the display device of the above embodiment of the present invention, a viewer can feel a strong stereoscopic effect or sense of depth in a two-dimensional image without variation among individuals or regardless of display content because the degree of a curvature or an inclination of the frame portion, or the shape or the size of an opening of the frame portion can be changed. Furthermore, as compared with the case where a frame portion which is not suitable for the viewer is provided between the viewer and a display portion, fatigue that the viewer feels can be reduced in such a manner that a frame portion in which the degree of a curvature or an inclination or the shape or the size of an opening is suitable for the viewer is provided between the viewer and the display portion.

Note that the display device of the above embodiment of the present invention is one mode of an eye-friendly display device which is less likely to strain eyes. For the display device of the above embodiment of the present invention, technologies of displaying images with less eyestrain (also referred to as a reducing eyestrain technology (REST)) are employed.

[Example]

In this example, a result of sensitivity evaluation carried out to verify whether a viewer can feel a stereoscopic effect in a two-dimensional image displayed on a display device will be described.

A display device used for the sensitivity evaluation includes a light-blocking frame portion, and a display portion which has a display surface on the frame portion side and is located so as to be apart from the frame portion with a distance therebetween. The display portion overlaps with an opening of the frame portion, and the end portion of the display portion overlaps with the frame portion. A display device without a frame portion was also used as a comparative example.

A sheet of black drawing paper was used for the light-blocking frame portion. For the display portion, a 7.4-inch sized organic EL panel having a resolution of Quarter HD (high definition) (960×540) was used.

The frame portion and the display portion (display surface) are substantially parallel to each other and a viewer sees a moving image displayed on the display portion from the front unless otherwise described. The distance between the viewer and the display portion was 50 cm. Evaluation was carried out in a dark room. The distance between the frame portion and the display portion was 5 cm.

In this example, three frame portions with different inner frame sizes (opening sizes) were used.

In a frame used in Sample 1, when the distance between a viewer and the display portion is 50 cm, the size of an opening of the frame portion and the size of the display portion appear to be substantially the same from the viewer side (an inner frame (the periphery of the opening) of the frame portion appears to substantially align with an end portion of the display portion) when the distance between the frame portion and the display portion is 20 cm. Therefore, when the distance between the frame portion and the display portion exceeds 20 cm, the viewer can see the end portion of the display portion through the opening of the frame portion.

In a frame used in Sample 2, in a similar manner, when the distance between a viewer and the display portion is 50 cm, the size of an opening of the frame portion and the size of the display portion appear to be substantially the same from the viewer side when the distance between the frame portion and the display portion is 10 cm. Therefore, when the distance between the frame portion and the display portion exceeds 10 cm, the viewer can see the end portion of the display portion through the opening of the frame portion.

In a frame used in Sample 3, when the distance between a viewer and the display portion is 50 cm, the size of an opening of the frame portion and the size of the display portion appear to be substantially the same from the viewer side when the distance between the frame portion and the display portion is 5 cm. Therefore, when the distance between the frame portion and the display portion exceeds 5 cm, the viewer can see the end portion of the display portion through the opening of the frame portion. In other words, the size of the inner frame of the frame portion of the Sample 1 is the smallest and that of the Sample 3 is the largest among Samples 1 to 3.

The following cases were compared to evaluate whether there was a difference in a stereoscopic effect, a sense of depth, and naturalness: the case where a display portion was viewed through an opening of a frame portion of one of the samples, and the case where the display portion was viewed without through the opening of the frame portion, which both displayed the same moving image. There were 11 examinees.

For the evaluation, a sematic differential (SD) method was used. Specifically, a stereoscopic effect, a sense of depth, and naturalness in the moving image of the display portion viewed through the opening of the frame portion of the one sample were evaluated by comparing with the case of viewing the display portion without through the opening of the frame portion on a scale of +2 to −2 ("extremely strong (+2)", "strong (+1)", "without change (0)", "weak (−1)", and "extremely weak (−2)".

Figure 10A:
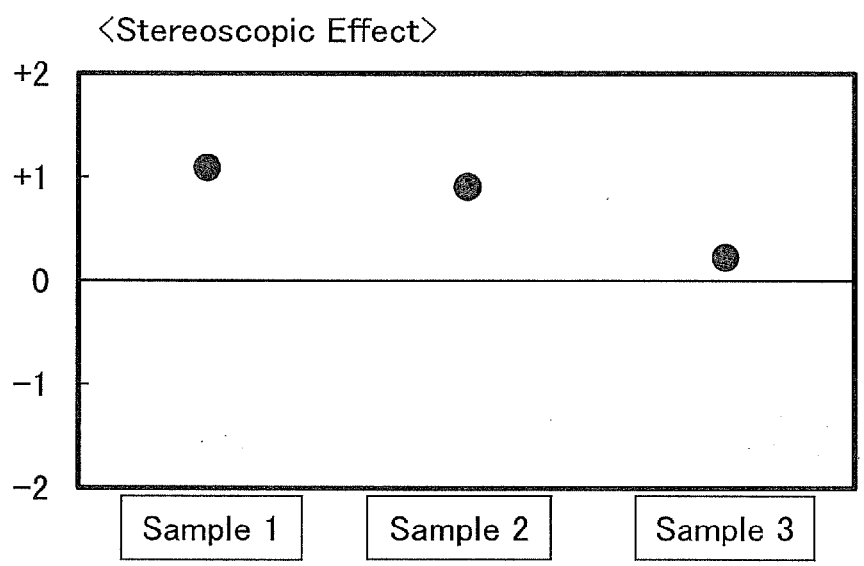
FIGS. 10A and 10B show results in Example.
Figure 10B:
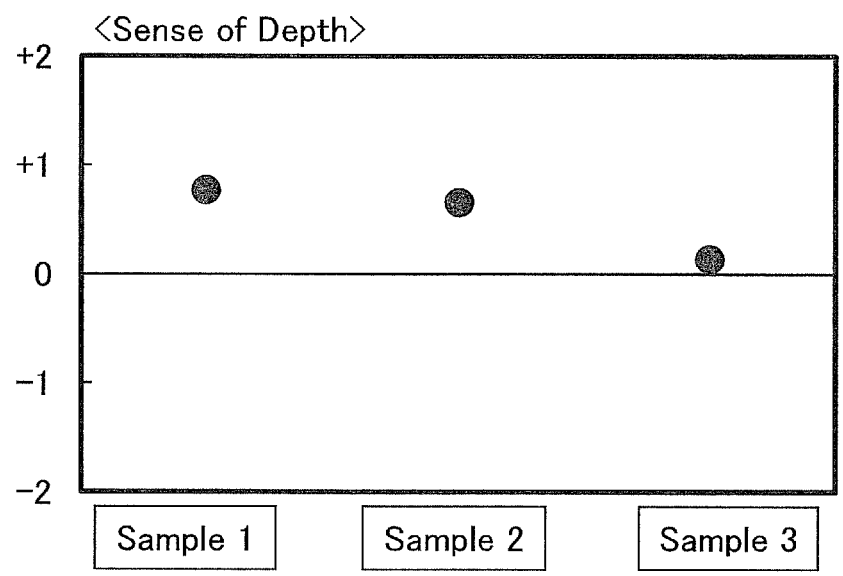
Figure 11:
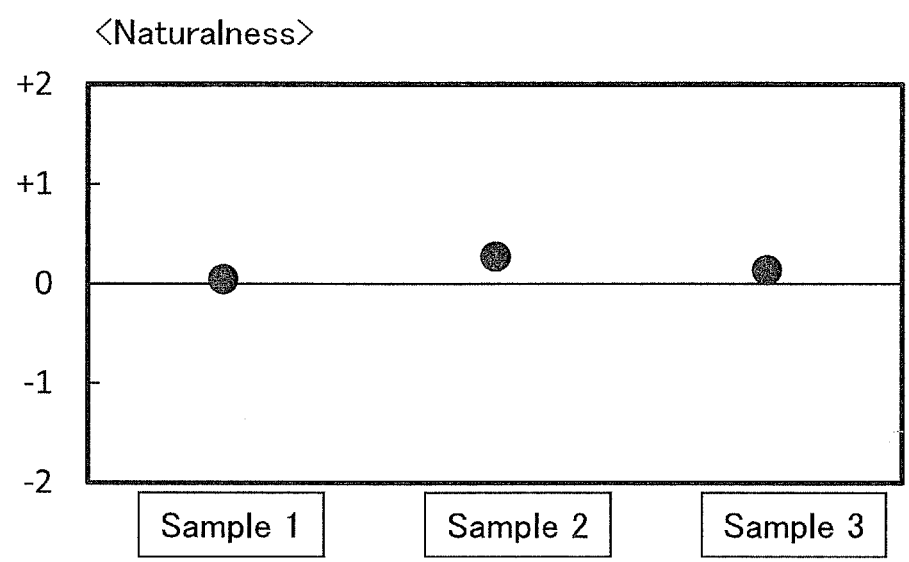
FIG. 11 shows results in Example.

FIGS. 10A and 10B and FIG. 11 show evaluation results. In each graph, the horizontal axis represents the kinds of samples. In the evaluation results, the average score of the 11 examinees is shown.

According to FIG. 10A, it is found that when the display portion is viewed through the opening of the frame portion, a stereoscopic effect in the image is strong as compared with the case of viewing the display portion without through the opening of the frame portion regardless of the size of the inner frame. In particular, it is found that a viewer was able to feel a stronger stereoscopic effect in the image on the display portion when the size of the inner frame is smaller.

According to FIG. 10B, it is found that when the display portion is viewed through the opening of the frame portion, a sense of depth in the image is strong as compared with the case of viewing the display portion without through the opening of the frame portion regardless of the size of the inner frame. In particular, it is found that a viewer was able to feel a stronger sense of depth in the image of the display portion when the size of the inner frame is smaller.

In addition, according to FIG. 11, it is found that when the case of viewing the display portion without through the opening of the frame portion and the case of viewing the display portion through the opening of the frame portion are compared, there was no difference in naturalness of the image, or the image appeared more natural in the case of viewing the display portion through the opening of the frame portion.

Note that although not shown in a graph, when the end portion of the display portion was able to be seen through the opening of the frame portion, a strong stereoscopic effect and sense of depth were unlikely to be obtained and further a stereoscopic effect or a sense of depth was weakened as compared with the case where the display portion was viewed without through the opening of the frame portion. In addition, when the end portion of the display portion was able to be seen through the opening of the frame portion, the viewer felt tired strongly and the image appeared abnormal to the viewer. Accordingly, in the display device of one embodiment of the present invention, it is preferable that the distance between the frame portion and the display portion be able to be controlled so that the end portion of the display portion overlaps with the frame portion and a viewer cannot see the end portion of the display portion.

As described above, it was found that the display device including the frame portion used in this example can have a stronger stereoscopic effect and sense of depth in a two-dimensional image as compared with the display device not including the frame portion.

This application is based on Japanese Patent Application serial no. 2013-244744 filed with Japan Patent Office on Nov. 27, 2013, the entire contents of which are hereby incorporated by reference.

What is claimed is:

1. A display device comprising:
a frame portion having an opening; and
a display portion comprising a display surface,
wherein the display portion partly overlaps with the frame portion,
wherein the display surface is flat,
wherein the frame portion is not parallel with the display surface, and
wherein the frame portion is variable in a shape.

2. The display device according to claim 1, comprising a driver portion attached to the frame portion.

3. The display device according to claim 1, wherein the frame portion is configured to have a curved shape.

4. The display device according to claim 3, wherein the curved shape is a convex shape or a concave shape.

5. The display device according to claim 1, wherein the frame portion is configured to be inclined with respect to the display surface.

6. The display device according to claim 1, wherein a whole portion of the display portion is configured to display an image.

7. The display device according to claim 1, comprising:
a structure body; and
a driver portion,
wherein the display portion is positioned between the structure body and the frame portion, and
wherein the driver portion is attached to the frame portion and the structure body.

8. The display device according to claim 7, comprising a processing portion comprising:
a memory portion;
an arithmetic processing portion electrically connected to the memory portion; and
a drive control portion electrically connected to the arithmetic processing portion.

9. The display device according to claim 8, wherein the processing portion is provided with the structure body.

10. The display device according to claim 8, wherein the processing portion is provided with the frame portion.

11. The display device according to claim 1, wherein the display element is one selected from the group consisting of an EL element, a LED, a transistor, an electron emitter, a liquid crystal element, electronic ink, an electrophoretic element, a grating light valve, a plasma display panel, a display element including a micro electro mechanical system (MEMS), a digital micromirror device, a digital micro shutter, an interferometric modulator element, a MEMS shutter display element, an optical interference type MEMS display element, an electrowetting element, a piezoelectric ceramic display, and a carbon nanotube.

12. A display device comprising:
a display portion comprising a display element; and
a frame portion at least partly overlapping with the display portion and having an opening configured so that a user views a display surface of the display portion through the opening,
wherein the display portion partly overlaps with the frame portion, and
wherein the display portion remains flat while the frame portion is variable in a shape.

13. The display device according to claim 12, wherein the frame portion is not parallel with the display surface.

14. The display device according to claim 12, comprising a driver portion attached to the frame portion.

15. The display device according to claim 12, wherein the frame portion is configured to have a curved shape.

16. The display device according to claim 15, wherein the curved shape is a convex shape or a concave shape.

17. The display device according to claim 12, wherein the frame portion is configured to be inclined with respect to the display surface.

18. The display device according to claim 12, wherein a whole portion of the display portion is configured to display an image.

19. The display device according to claim 12, comprising:
a structure body; and
a driver portion,
wherein the display portion is positioned between the structure body and the frame portion, and
wherein the driver portion is attached to the frame portion and the structure body.

20. The display device according to claim 19, comprising a processing portion comprising:
a memory portion;
an arithmetic processing portion electrically connected to the memory portion; and
a drive control portion electrically connected to the arithmetic processing portion.

21. The display device according to claim 20, wherein the processing portion is provided with the structure body.

22. The display device according to claim 20, wherein the processing portion is provided with the frame portion.

23. The display device according to claim 12, wherein the display element is one selected from the group consisting of an EL element, a LED, a transistor, an electron emitter, a liquid crystal element, electronic ink, an electrophoretic element, a grating light valve, a plasma display panel, a display element including a micro electro mechanical system (MEMS), a digital micromirror device, a digital micro shutter, an interferometric modulator element, a MEMS shutter display element, an optical interference type MEMS display element, an electrowetting element, a piezoelectric ceramic display, and a carbon nanotube.

* * * * *

UNITED STATES PATENT AND TRADEMARK OFFICE
CERTIFICATE OF CORRECTION

PATENT NO. : 9,804,405 B2
APPLICATION NO. : 14/546434
DATED : October 31, 2017
INVENTOR(S) : Yuichi Yanagisawa et al.

It is certified that error appears in the above-identified patent and that said Letters Patent is hereby corrected as shown below:

In the Claims

In Claim 1, at Column 15, Line 37, cancel the text beginning with "1. A display device" to and ending "a shape." in Column 15, Line 45, and insert the following claim:
--1. A display device comprising:
   a display portion comprising a display element; and
   a frame portion at least partly overlapping with the display portion and having an opening configured so that a user views a display surface of the display portion through the opening,
      wherein the frame portion is not parallel with the display surface, and
      wherein the display surface is flat while the frame portion is variable in a shape.--

Signed and Sealed this
Sixth Day of February, 2018

Joseph Matal
*Performing the Functions and Duties of the
Under Secretary of Commerce for Intellectual Property and
Director of the United States Patent and Trademark Office*